United States Patent [19]

Rickelton et al.

[11] Patent Number: 5,028,403
[45] Date of Patent: Jul. 2, 1991

[54] METAL RECOVERY WITH MONOTHIOPHOSPHINIC ACIDS

[75] Inventors: William A. Rickelton, Niagara Falls; Allan J. Robertson, Thorold, both of Canada

[73] Assignee: American Cyanamid Company, Me.

[21] Appl. No.: 474,874

[22] Filed: Feb. 5, 1990

[30] Foreign Application Priority Data

May 31, 1989 [CA] Canada .................................. 601365

[51] Int. Cl.$^5$ ...................... B01D 11/00; B01D 15/04; C01G 3/00; C22B 15/00
[52] U.S. Cl. ......................................... 423/24; 75/722; 210/634; 210/638; 423/49; 423/100; 423/139
[58] Field of Search ................... 423/49, 100, 139, 24; 75/722; 210/634, 638

[56] References Cited

U.S. PATENT DOCUMENTS

| | | | |
|---|---|---|---|
| 4,233,273 | 11/1980 | Meyer et al. | 423/139 |
| 4,348,367 | 9/1982 | Rickelton et al. | 423/139 |
| 4,353,883 | 10/1982 | Rickelton et al. | 423/139 |
| 4,374,780 | 2/1983 | Robertson | 423/139 |
| 4,587,013 | 5/1986 | Nagaraj et al. | 252/61 |
| 4,619,816 | 10/1986 | Rickelton | 75/722 |
| 4,661,278 | 4/1987 | Nagaraj et al. | 252/61 |
| 4,721,605 | 1/1988 | Brown et al. | 423/100 |

FOREIGN PATENT DOCUMENTS 24969 11/1965 Japan .................................. 423/139

*Primary Examiner*—Prince E. Willis
*Assistant Examiner*—R. D. Flatter
*Attorney, Agent, or Firm*—Frank M. Van Riet

[57] ABSTRACT

Metals selected from the group consisting of zinc (II), cadmium (II), nickel (II), cobalt (II), manganese (II), iron (III) and copper (II) from aqueous solutions containing the same are extracted therefrom by contacting said solution with an extractant having the formula

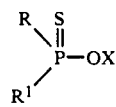

wherein R and R$^1$ are, individually, selected from the group consisting of substituted or unsubstituted alkyl, cyloalkyl, alkoxyalkyl, alkylcycloalkyl, aryl, alkaryl, aralkyl and cycloalkylaryl radicals having 2-24 carbon atoms and X is hydrogen, ammonium or an alkali or alkaline earth metal salt-forming radical.

16 Claims, No Drawings

METAL RECOVERY WITH MONOTHIOPHOSPHINIC ACIDS

BACKGROUND OF THE INVENTION

The extraction of metals from aqueous solutions, particularly those aqueous solutions containing, in addition thereto, other metals which are of less value, is well known. In fact, the recovery of zinc, cadmium, nickel, copper, iron, cobalt, etc. utilizing phosphorus containing extractants has been known for many years, see U.S. Pat. No. 3,966,569.

More recently, in U.S. Pat. Nos. 4,348,367 and 4,619,816 cobalt has been recovered from aqueous solutions, free of or containing nickel, with various phosphinic acids such as bis(2,4,4-trimethylpentyl) phosphinic acid. U.S. Pat. No. 4,382,016 discloses a composition for use in the extraction comprising an inert material and an organophosphinic acid while U.S. Pat. No. 4,374,780 is also pertinent in said separations. U.S. Pat. No. 4,721,605 discloses the extraction of zinc, silver, cadmium, mercury, nickel, cobalt and copper from aqueous solution utilizing dithiophosphinic acids or their salts.

Thus, it can be readily appreciated that many phosphinic acid derivatives have been found to be excellent extractants for the recovery of variety of metals from aqueous solutions containing said metals alone or in combination with other, less desirable metals.

It has been recognized that the phosphinic acids of U.S. Pat. No. 4,382,016 are less acidic than those dithiophosphinic acids of U.S. Pat. No. 4,721,605, i.e., the acidity of the acids increases with increasing sulfur content of the molecule. Because the strongest acids, i.e., the dithiophosphinic derivatives function at lower pHs they provide superior separations from various low pH effluent streams, however, their strength also is a detriment because it renders the extracted metal more difficult to strip therefrom. Thus, while excellent extraction of zinc, for example, is achieved using the dithiophosphinic acids, the recovery of the zinc from the extractant phase is very difficult thereby rendering the overall process of using the dithiophosphinic acids more costly. While many industries can tolerate the higher cost of using the dithiophosphinic acids, certain industries where the savings resulting from the metal recovery is small, would prefer to use extractants from which the extracted metal is more easily recovered.

Therefore, if an extraction process would be devised which would enable complete extraction of metals from aqueous solution and a less expensive metal recovery from the extractant phase, a long felt need would be satisfied.

SUMMARY OF THE INVENTION

The present invention provides a process for the extraction of metals selected from the group consisting of zinc (II), cadmium (II), nickel (II), cobalt (II), manganese (II), iron (III), and copper (II) from an aqueous solution comprising contacting said solution having a pH below about 7.0 with an extractant having the formula:

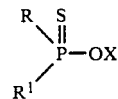

wherein R and $R^1$ are, individually, selected from the group consisting of substituted or unsubstituted alkyl, cycloalkyl, alkoxyalkyl, alkylcycloalkyl, aryl, alkaryl, aralkyl and cycloalkylaryl radicals having from 2-24 carbon atoms, inclusive, and X is hydrogen, ammonium, or an alkali or alkaline earth metal salt forming radical.

DESCRIPTION OF THE INVENTION INCLUDING PREFERRED EMBODIMENTS

In carrying out the process of the present invention, extraction techniques compatible with an extractant include, but are not limited to, liquid-liquid extraction employing either mixer settlers or columns, such as reciprocating-plate columns, pulse columns or columns employing rotating impellers; packed beds of supported extractants wherein the support can be an inert material, see U.S. 3,960,762 or selective supported membrane extraction as is known in the art.

The extractants useful in the instant process are organic-soluble monothiophosphinic acids or their organic-soluble ammonium, (ammonium including substituted ammonium such as morpholine, piperidino, trimethyl ammonium etc.) alkali (e.g. sodium, potassium etc.) or alkaline earth (e.g. calcium, magnesium etc.) salts. The free acid is preferred. The pure extractant can be used, as such, by contacting the extractant with the aqueous metal-containing solution. When complete, the resultant extract phase, containing the extractant and extracted metals, is separated from the resultant aqueous phase, containing, the water and non-extracted metals. The extracted metals are separated from the extractant by stripping with mineral acids. It is generally preferred, however, to employ an extraction solvent comprising from about 2 to about 99 parts, by volume, of extractant with from about 98 to 1 part, by volume, of a water-immiscible organic diluent, preferably about 2 to about 70 parts of the extractant with from about 98 to about 30 parts, same basis, of diluent. The extraction solvent may, optionally, contain from about 0 to about 15 parts, of a phase modifier to promote the separation of the phases and/or increase the solubility of the extracted metals in the extractant phase. If a phase modifier is employed, the amount of organic diluent should be reduced by a corresponding amount.

Generally, a wide variety of water-immiscible or organic liquids may be used as the diluent. Suitable diluents include, but are not limited to, carbon tetrachloride, toluene, xylene, kerosene, naphtha, tridecanol, methylisobutylketone, tributylphosphate, cyclohexane, decane, pyridine, dibromoethane, and the like. Preferably, the diluent is an aliphatic or aromatic petroleum distillate. More preferably an aliphatic petroleum distillate is utilized. Suitable phase modifiers, when employed, include: tributylphosphate, tributylphosphine oxide, trioctylphosphine oxide, isodecanol, nonylphenol, and the like.

The organic-soluble monothiophosphinic acids or ammonium, alkali or alkaline earth metal salts thereof are represented by the formula:

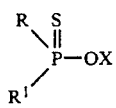

wherein R, R¹ and X are as identified above, Preferably the alkyl groups have 4–8 carbon atoms, inclusive, and more preferably the R and R¹ groups are both 2,4,4-trimethylpentyl groups.

Representative organothiophosphinic acids include but are not limited to:

diethyl; di-n-propyl; diisopropyl; di-n-butyl; di-isobutyl; di-n-pentyl; di-n-hexyl; di-n-octyl; di-n-nonyl; di-n-decyl-di-n-dodecyl-bis(2,4,4-trimethylpentyl); (2,4,4-trimethylpentyl) cyclohexyl; (2,4,4-trimethylpentyl) octyl; dicyclopentyl; dicyclohexyl; dicyclooctyl; cyclohexyl, n-butyl; cyclopentyl, n-dodecyl; cyclooctyl ethyl; 2,4,6-triisopropyl-1,3,5-dioxaphosphorinane, 5-hydroxy, 5-oxide; cyclohexyl, phenyl; cyclopentyl-p-tolyl; di-m-tolyl; di-p-tolyl; bis(2,3-dimethylphenyl); bis(2,4-dimethylphenyl); bis(2,5-dimethylphenyl); bis(2,6-dimethylphenyl); bis(3,4-dimethylphenyl); 3,5-dimethylphenyl); di-p-ethylphenyl); ethylphenyl; n-butylphenyl; n-octyl, phenyl; ethyl-o-tolyl; bis(o-chlorophenyl); bis(m-chlorophenyl); bis(p-chlorophenyl); methyl-o-chlorophenyl; n-propyl-p-chlorophenyl; n-dodecyl-p-chlorophenyl; dibenzyl; methyl-naphthyl; diallyl; cyclohexyl, 1-hydroxycyclohexyl; bis(2-methyl-1-hydroxyphenyl); benzyl, alpha-hydroxybenxyl; o-chlorobenzyl, alpha-hydroxy-o-chlorobenzyl; p-chlorobenzyl, alpha-hydroxy-p-chlorobenzyl; phenyl, alphamethylbenzyl, cyclopentyl, 1-hydroxycyclopentyl; alpha-methylbenzyl, alpha-hydroxyl-alpha-methylbenzyl; 1-methylpentyl, 1-hydroxy-1-methylpentyl; n-octyl-alpha-hydroxybenzyl; (1-hydroxy-1-methylethyl); isopropyl. Mixtures of one or more of the monothiophosphinic acids or salts may also be used.

The separations of metals achieved by the process of the present invention comprise the extraction of zinc, cadmium, nickel, cobalt, manganese, iron or copper, or mixtures thereof from aqueous solution. Preferably, said extraction is of zinc, cobalt, manganese or nickel and, most preferably, the extraction is of zinc. A further feature of the extraction process hereof is the extraction of said metals from aqueous solutions which also contain calcium (II) and magnesium (II). The recovery of zinc from aqueous solutions containing zinc and calcium is most preferred.

In the processes of this invention, the metal bearing aqueous solution is contacted either batchwise, continuously co-current, continuously counter-current or continuously cross-current with the extraction solvent. The aqueous solution should have equilibrium pH of below about 7.0 with about 0.8 to about 6.0 being preferred and about 1.0 to about 5.0 being most preferred. The ratio of aqueous to organic phase should be chosen to most effectively remove the selected metals. Aqueous to organic ratios of from 1:20 to 20:1 are believed to be effective, although other ratios may prove to be effective, depending upon the specific separation. Phase contact is commonly achieved in devices called "mixer-settlers", although many other types of devices are available and suitable. In the mixer, one phase is dispersed with the other by stirring or some other appropriate form of agitation. The extraction solvent then forms a complex with the metals to be extracted which reports to be organic phase of the two-phase liquid mixture. The dispersion then flows to the settler where phase disengagement occurs under quiescent conditions. Generally, extraction is carried out between 0°–80° C., preferably 20°–70° C.

The extracted metals may be separated from each other and recovered from the organic phase by known techniques, for example, by stripping with common mineral acids such as sulfuric acid, nitric acid, hydrochloric acid, hydrobromic acid, hydrofluoric acid and the like.

It is to be understood the although much of the preceding disclosure relates to liquid-liquid extraction, the principles and properties are believed to extend to those other extraction techniques previously set forth.

The following examples are set forth for purposes of illustration only and are not be construed as limitations on the invention except as set forth in the appended claims.

EXAMPLES 1–6

An aqueous solution is prepared containing 0.015M of metal therein as the sulfate salt. Bis(2,4,4-trimethylpentyl) monothiophosphinic acid is added to an aliphatic petroleum distillate at a concentration such as to result in a 0.6M solution. Upon mixing the two solutions, the aqueous phase to organic phase volume ratio is 1. The temperature is 50° C. The pH is controlled by adding sulfuric acid. The aqueous phase is the continuous phase. Once the metal solution and extractant solution are mixed, the sulfuric acid is added to obtain the predetermined pH. After the pH remains stable for 2 minutes, a 100 ml sample of the dispersed phase is removed for separation and aqueous analysis. The process is repeated to obtain a sufficient number of data points to establish a pH dependence. Equilibrium organic concentrations are calculated by mass balance. The results are set forth in Table I, below.

TABLE I

| Extraction From Metal Sulfate Solutions | |
|---|---|
| Percent Extraction | Equilibrium pH |
| Example 1 Metal: Zinc (II) | |
| 37.2 | 0.48 |
| 66.4 | 0.83 |
| 86.2 | 1.10 |
| 95.1 | 1.33 |
| 99.5 | 1.82 |
| Example 2 Metal: Iron (III) | |
| 45.9 | 0.68 |
| 66.9 | 1.08 |
| 73.2 | 1.18 |
| 71.2 | 1.58 |
| 64.3 | 2.08 |
| 61.1 | 2.63 |
| Example 3 Metal: Cobalt (II) | |
| 0 | 1.10 |
| 36.3 | 2.49 |
| 87.8 | 3.22 |
| 97.8 | 3.76 |
| 99.0 | 4.01 |
| Example 4 Metal: Manganese (II) | |
| 1.85 | 1.99 |
| 7.41 | 2.49 |
| 20.4 | 3.13 |
| 73.3 | 4.02 |
| 98.9 | 5.28 |
| Example 5 Metal: Nickel (II) | |
| 5.81 | 1.86 |

TABLE I-continued

Extraction From Metal Sulfate Solutions

| Percent Extraction | Equilibrium pH |
| --- | --- |
| 17.4 | 3.15 |
| 32.6 | 4.08 |
| 90.6 | 5.04 |
| 99.4 | 6.08 |

Example 6 (Comparative)
Metal: Calcium (II)

| Percent Extraction | Equilibrium pH |
| --- | --- |
| 4.76 | 0.81 |
| 6.67 | 1.19 |
| 10.5 | 2.18 |
| 14.3 | 4.14 |
| 17.1 | 5.10 |

EXAMPLE 7

Following the procedure of Examples 1-6, cadmium (II) is quantitatively extracted at an equilibrium pH of from 0.85 to 4.98.

EXAMPLE 8

Again following the procedure of Examples 1.6, copper (II) is quantitatively extracted at an equilibrium pH of from 1.39 to 2.10.

EXAMPLE 9 (COMPARATIVE)

When the procedure of Examples 1-6 is followed for magnesium (II) at an equilibrium pH of from 0.65 to 5.30, no extraction thereof is detected.

EXAMPLE 10

In order to establish the efficacy of the stripping of the metals from the monothiophosphinic acids during the process of the present invention, a series of tests are conducted as set forth in Table II, below, utilizing bis(2,4,4-trimethylpentyl) dithiophosphinic acid (designated BDPA) and bis(2,4,4-trimethylpentyl) monothiophosphinic acid (designated BMPA) as extractants for zinc. The zinc stripping exotherms are generated by contacting aliquots of the loaded solvent extractant with aliquots of the strip feed (sulfuric acid) at various aqueous phase to organic phase volume phase ratios. After contact, the aqueous phases are analyzed for zinc and the organic zinc concentration is calculated by mass balance.

TABLE II

| | BDPA | | | BMPA | |
| --- | --- | --- | --- | --- | --- |
| Solvent: | 0.2M in petroleum distillate, loaded to 7.29 g/L Zn by contact with an aqueous ZnSO$_4$ solution | | Solvent: | 0.6M in petroleum distillate, loaded to 6.40 g/L Zn by contact with an aqueous ZnSO$_4$ solution | |
| Strip Feed: | 300 g/L H$_2$SO$_4$ | | Strip Feed | 200 g/L H$_2$SO$_4$ | |
| Temp: | 50° C. | | Temp: | 50° C. | |
| Time: | 5 minutes | | Time: | 5 minutes | |
| A/O | Organic | Aqueous | A/O | Organic | Aqueous |
| 5 | 1.84 | 1.09 | 5 | 0.40 | 3.0 |
| 2 | 2.85 | 2.22 | 2 | 0.40 | 6.0 |
| 1 | 3.59 | 3.70 | 0.5 | 0.55 | 11.7 |
| 0.5 | 4.24 | 6.10 | 0.2 | 0.48 | 29.6 |
| 0.2 | 4.93 | 11.80 | 0.1 | 1.24 | 51.6 |
| 0.1 | 5.45 | 18.40 | | | |
| 0.05 | 5.71 | 31.60 | | | |

The data of Table II shows that BMPA is more readily stripped from zinc even when the concentration of BDPA in the solvent is lower and the strip feed is less concentrated.

EXAMPLE 11

The procedure of Examples 1-6 is again followed except that diisobutylmonothiophosphinic acid is employed. Similar results are achieved.

EXAMPLES 12-19

Various monothiophosphine compounds represented by the formula set forth above are employed as extractants for zinc in accordance with the procedure of Examples 1-6, above. The different compounds used are set forth in Table III, below. In each instance, excellent zinc extraction is observed.

TABLE III

| | | Monothiophosphine Compound | |
| --- | --- | --- | --- |
| Example | R | R$^1$ | X |
| 12 | octyl | octyl | Na |
| 13 | 2-ethylhexyl | 2-ethylhexyl | NH$_4$ |
| 14 | 4-methylphenyl | 4-methylphenyl | H |
| 15 | cyclohexyl | cyclohexyl | H |
| 16 | phenyl | phenyl | NH$_4$ |
| 17 | 2-methoxyethyl | 2-methoxyethyl | H |
| 18 | benzyl | benzyl | K |
| 19 | 3,3-dimethylbutyl | 3,3-dimethylbutyl | H |

EXAMPLE 11

Following the procedure of Example 10, a series of tests are conducted in order to compare the monothiophosphonic acids of the present invention to a non-thioic extractant, i.e., bis (2,4,4-trimethylpentyl) phosphinic acid (designated BTPA) in the extraction of zinc or calcium. The extractants are employed as 0.6M solutions in an aliphatic petroleum distillate. The metals are extracted from 0.015M solutions in water as the sulfate salt. Phase contact is 5 minutes at A/O=1 at 50° C. The pH is controlled with sulfuric acid or ammonium hydroxide, as required. The results are set forth in Table IV, below. BMPA=see Example 10.

TABLE IV

| BMPA | | BTPA | |
| --- | --- | --- | --- |
| Zinc Extraction | | | |
| % Zn | Equilibrium pH | % Zn | Equilibrium pH |
| 37.2 | 0.48 | 14.6 | 0.90 |
| 66.4 | 0.83 | 22.4 | 1.42 |
| 86.2 | 1.10 | 53.3 | 1.88 |
| 95.1 | 1.33 | 87.7 | 2.40 |
| 99.5 | 1.82 | 99.4 | 3.08 |
| Calcium Extraction | | | |
| % Ca | Equilibrium pH | % Ca | Equilibrium pH |
| 4.76 | 0.81 | 3.40 | 4.15 |
| 6.67 | 1.19 | 20.40 | 4.53 |
| 10.50 | 2.18 | 81.70 | 5.38 |
| 14.30 | 4.14 | 99.60 | 6.52 |
| 17.10 | 5.10 | | |

The ability of the BMPA of the present invention to extract metal under very acidic conditions is clearly demonstrated vis-a-vis the structurally closely related phosphinic acid.

We claim:

1. A process for the extraction of metals selected from the group consisting of zinc (II), cadmium (II), nickel (II), cobalt (II), manganese (II), iron (III) and copper (II) from an aqueous solution comprising contacting said solution having a pH below about 7.0 with an extractant having the formula:

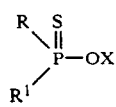

wherein R and $R^1$ are, individually, selected from the group consisting of substituted or unsubstituted alkyl, cycloalkyl, alkoxyalkyl, alkylcycloalkyl aryl, alkaryl, aralkyl and cycloalkylaryl radicals having from 2 to 24 carbon atoms, inclusive, and X is hydrogen, ammonium or an alkali or alkaline earth metal salt-forming radical and separating the resultant aqueous phase from the resultant extractant phase containing the extracted metal.

2. The process of claim 1 including the additional step of recovering the extracted metal from said extractant phase by stripping with a mineral acid.

3. The process of claim 1 wherein the extraction is conducted at a temperature ranging from about 0° C. to about 80° C.

4. The process of claim 1 wherein the pH ranges from about 0.8 to about 6.0.

5. The process of claim 1 wherein said alkyl groups contain 4 to 8 carbon atoms, inclusive.

6. The process of claim 5 wherein said alkyl groups are 2,4,4-trimethylpentyl.

7. The process of claim 1 wherein said extractant is bis(2,4,4-trimethylpentyl)-monothiophosphinic acid.

8. The process of claim 1 wherein the extraction is conducted at a temperature ranging from about 0° C. to about 80° C., a pH ranging from about 1.0 to about 6.0 and wherein the alkyl groups contain from 4-8 carbon atoms, inclusive.

9. The process of claim 8 wherein said extractant is bis(2,4,4-trimethylpentyl)monothiophosphinic acid.

10. The process of claim 1 wherein said aqueous solution contains, in addition to said metal, calcium (II) and/or magnesium (II).

11. A process for the extraction of metals selected from the group consisting of zinc (II), cadmium (II), nickel (II), cobalt (II), manganese (II), iron (III) and copper (II) from an aqueous solution comprising contacting said solution with an extraction solvent comprising 1) from about 2 to about 99 parts, by volume, of a compound having the formula:

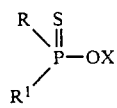

wherein R and $R^1$ are, individually, selected from the group consisting of substituted or unsubstituted alkyl, cycloalkyl, alkoxyalkyl, alkylcycloalkyl, aryl, alkaryl, aralkyl and cycloalkylaryl radicals having from 2 to 24 carbon atoms, inclusive, and X is hydrogen, ammonium or an alkali or alkaline earth metal salt-forming radical,
2) from about 98 to about 1 part, by volume of a water-immiscible organic diluent, and
3) from about 0 to about 15 parts, by volume, of a phase modifier. and separating the resultant aqueous phase from the resultant extractant phase containing the extracted metal.

12. The process of claim 11 wherein said compound is bis(2,4,4-trimethylpentyl) monothiophosphinic acid.

13. The process of claim 11 wherein said extraction is of zinc II, cobalt (II), manganese (II) or nickel (II) from an aqueous solution containing at least one of said metals and calcium (II) or magnesium (II).

14. The process of claim 11 wherein said extraction is of zinc (II) from an aqueous solution containing calcium (II) and zinc (II).

15. The process of claim 14 wherein said compound is bis(2,4,4-trimethylpentyl)monothiophosphinic acid.

16. The process of claim 11 including the additional step of recovering the extracted metal from the resultant extraction phase containing the extracted metal by stripping with a mineral acid.

* * * * *